(12) United States Patent
James (10) Patent No.: US 9,432,712 B2
(45) Date of Patent: Aug. 30, 2016

(54) UPDATING CHANNEL APPEARANCE (71) Applicant: ZEFR, Inc., Venice, CA (US)

(72) Inventor: Zacharias Lee James, Venice, CA (US)

(73) Assignee: ZEFR, INC., Venice, CA (US)

( * ) Notice: Subject to any disclaimer, the term of this patent is extended or adjusted under 35 U.S.C. 154(b) by 112 days.

(21) Appl. No.: 14/161,229

(22) Filed: Jan. 22, 2014

(65) Prior Publication Data

US 2015/0208108 A1    Jul. 23, 2015

(51) Int. Cl.
| | |
|---|---|
| G06F 3/00 | (2006.01) |
| H04N 7/16 | (2011.01) |
| H04N 21/2668 | (2011.01) |
| H04N 21/482 | (2011.01) |
| H04N 21/442 | (2011.01) |
| H04N 21/658 | (2011.01) |
| H04N 21/431 | (2011.01) |

(52) U.S. Cl.
CPC .... *H04N 21/2668* (2013.01); *H04N 21/44222* (2013.01); *H04N 21/482* (2013.01); *H04N 21/6582* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 8,875,177 B1* | 10/2014 | Sharma et al. | 725/34 |
| 8,875,180 B2* | 10/2014 | Demchenko | H04N 21/482 725/109 |
| 9,179,192 B1* | 11/2015 | Ning | G01C 21/28 |
| 2002/0112239 A1* | 8/2002 | Goldman | 725/46 |
| 2003/0009757 A1* | 1/2003 | Kikinis | H04N 5/44543 725/39 |
| 2003/0084443 A1* | 5/2003 | Laughlin | H04N 7/165 725/39 |
| 2008/0313040 A1* | 12/2008 | Rose | G06Q 30/02 705/14.69 |
| 2013/0111512 A1* | 5/2013 | Scellato | H04L 67/18 725/14 |
| 2013/0347039 A1* | 12/2013 | Klappert et al. | 725/46 |
| 2014/0149441 A1* | 5/2014 | Wang | G06Q 10/00 707/758 |
| 2014/0324922 A1* | 10/2014 | Edelstein | G06F 17/30091 707/812 |
| 2014/0325537 A1* | 10/2014 | Garg | H04N 21/2543 725/4 |
| 2015/0074718 A1* | 3/2015 | Moguillansky | H04N 21/482 725/40 |
| 2015/0201245 A1* | 7/2015 | Lau | H04N 21/482 725/50 |

* cited by examiner

*Primary Examiner* — Jason K Lin
(74) *Attorney, Agent, or Firm* — Kunzler Law Group; Scott D. Thorpe (57) ABSTRACT

For updating channel appearance, an appearance module stores an appearance modification to a channel appearance of a channel providing content from a content host. A modification module updates the channel appearance with the appearance modification if a modification policy is satisfied.

5 Claims, 7 Drawing Sheets

| Channel Header Data 305 |
|---|
| Channel Title Data 310 |
| Channel Title Format 311 |
| Channel Menu Data 320 |
| Channel Menu Format 321 |
| Content Criteria 325 |
| Content Title Format 330 |
| Content Data Format 335 |
| Channel Navigation Label Data 340 |
| Channel Navigation Label Format 341 |
| Channel Layout 355 |
| Channel Color Scheme 360 |
| Channel Metadata 365 |
| Modification Policy 370 |

UPDATING CHANNEL APPEARANCE

FIELD

The subject matter disclosed herein relates to channel appearance and more particularly relates to updating channel appearance.

BACKGROUND

Description of the Related Art

Content hosts often organize content in channels. Channels may have customizable appearances.

BRIEF SUMMARY

A method for updating channel appearance is disclosed. An appearance module stores an appearance modification to a channel appearance of a channel providing content from a content host. A modification module updates the channel appearance with the appearance modification if a modification policy is satisfied. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

Figure 1:
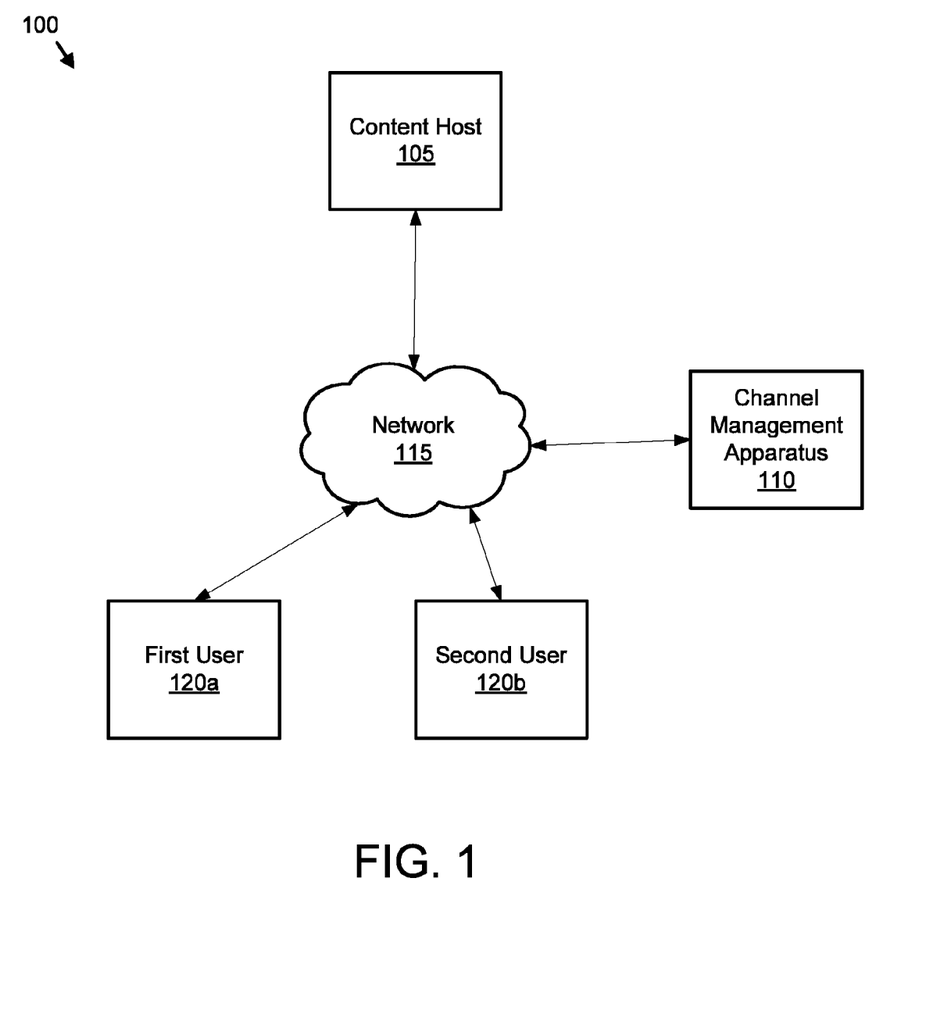
FIG. 1 is a schematic block diagram illustrating one embodiment of a content system.

FIG. 1 is a schematic block diagram illustrating one embodiment of a content system 100. The system 100 includes a content host 105, a channel management apparatus 110, a network 115, and one or more users 120. The content host 105 may comprise a plurality of servers that provide content. The content host 105 may provide the content to the users 120. The content may be uploaded to the content host 105 by the users 120, commercial content providers, and/or the content host 105. Examples of content hosts 105 include YOUTUBE®, INSTAGRAM®, and the like.

The content host 105 may communicate the content to the users 120 through the network 115. The network 115 may be the Internet, a mobile telephone network, a Wi-Fi network, Bluetooth network, a local area network, a wide area network, or combinations thereof.

Content may be organized on the content host 105 by channels, topics, categories, groups, and the like, which are referred to hereafter as channels. The user 120 may view content on the content host 105 within a channel. The channel may have a specific appearance including displayed images and video, color schemes, content, text themes, and the like.

The channel management apparatus 110 may be embodied in a server, a computer workstation, or combinations thereof. The channel management apparatus 110 may manage content on the content host 105. In addition, the channel management apparatus 110 may manage the appearance of one or more channels that include the managed content on the content host 105. In one embodiment, channel management apparatus 110 manages a large number of channels.

It is often beneficial to change channel appearance. For example, it may be beneficial to change the channel appearance to commemorate a holiday, an important event, an anniversary of an important event, an individual, and the like. In addition, it may be beneficial to change the channel appearance in response to engagement activity, such as user approval of a content element, referred to hereafter as a like.

In the past, channel appearance updates have been implemented manually, greatly restricting the number of channels that could be modified, the timeframe for which modifications could be applied, and the scope of the modifications. In addition, such manual updates did not support changes in channel appearance based on engagement activity.

The embodiments described herein store appearance modification to the channel appearance of a channel and update the channel appearance with the appearance modification if a modification policy is satisfied. As a result, appearance modifications may be made for large numbers of channels, for short time frames, and for extensive modifications to the channel appearance, as will be described hereafter. In addition, appearance modifications may be made in response to engagement activity, customizing the channel based on user engagement, as will be described hereafter.

Figure 2:
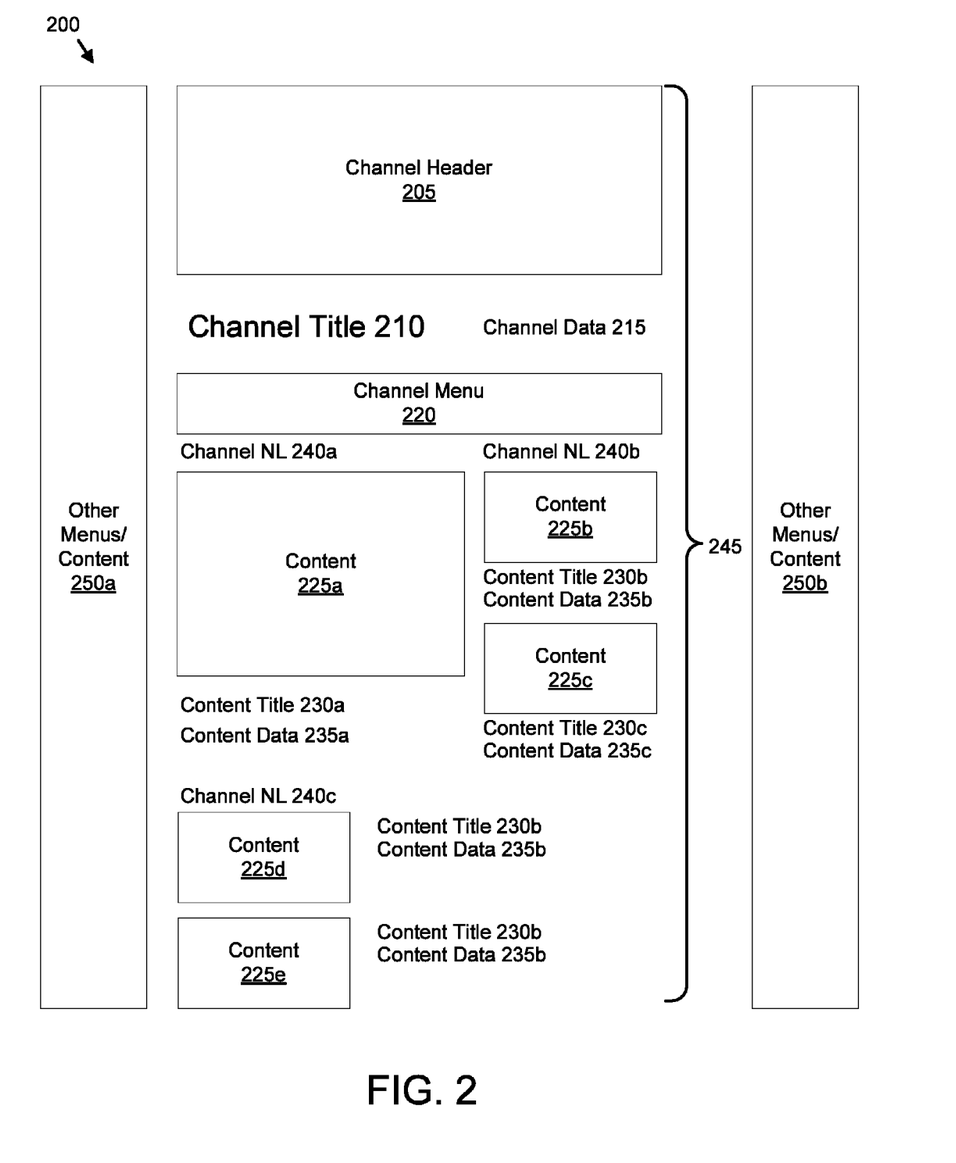
FIG. 2 is a schematic drawing illustrating one embodiment of a channel.

FIG. 2 is a drawing illustrating one embodiment of a channel 200. In the depicted embodiment, the channel 200 includes a channel header 205, a channel title 210, channel data 215, a channel menu 220, one or more channel navigation labels 240, content 225, one or more content titles 230, and content data 235. In one embodiment, the channel header 205, the channel title 210, the channel data 215, the channel menu 220, the channel navigation labels 240, the content 225, the content titles 230, and the content data 235 are embodied in a channel appearance 245.

The channel appearance 245 may be described by appearance data, which will be described hereafter. Replacing current appearance data for the channel 200 with modified appearance data may change the channel appearance 245.

In addition, the channel 200 may include other menus/content 250. The other menus/content 250 may be managed by the content host 105. Alternatively, the other menus/content 250 may be managed by the channel management apparatus 110. In a certain embodiment, the other menus/content 250 are managed by a combination of the content host 105 and the channel management apparatus 110.

The channel header 205 may be an image, video, text, or combinations thereof that identify and/or promote the channel 200. In one embodiment, the channel title 210 may be embodied in the channel header 205. The channel title 210 may uniquely identify the channel 200.

The channel data 215 may include subscription information such as whether or not a user 120 is subscribed to the channel 200. In addition, the channel data 215 may include a number of views, social media links, and the like.

The channel menu 220 may provide control icons for navigating within the channel 200. For example, the channel menu 220 may allow access to specific portions of the channel 200 by selecting a corresponding control icon.

The channel navigation links 240 may provide additional control icons for navigating within the channel 200. The channel navigation links 240 may link to popular content, promotional content, recent content, or combinations thereof.

The content 225 may include specific content elements such as video, images, audio, text, or combinations thereof. The content title 230 may identify the content 225. The content data 235 may include upload information, view information, engagement information, or combinations thereof.

The channel appearance 245 may be managed by the channel management apparatus 110. The channel appearance may comprise one or more of the channel layout, a channel color scheme, the channel header 205, the channel title 210, a channel title format, the channel menu 220, a channel menu format, content criteria, the channel navigation labels 240, a channel navigation label format, a channel data format, a content title format, a content data format, and channel metadata.

The channel layout may include the organization of the channel header 205, channel title 210, the channel data 215, the channel menu 220, the channel navigation labels 240, the content 225, the content titles 230, and the content data 235 within the channel 200. The channel color scheme may specify the colors used for text, borders, backgrounds, and the like. The channel title format, the channel menu format, the channel navigation label format, the channel data format, the content title format, and the content data format may specify text parameters including but not limited to fonts, colors, shadows, fill patterns, highlights, and effects.

The content criteria may specify selection criteria for the content 225 displayed in the channel 200. In one embodiment, the content 225 is selected in response to the content criteria. Alternatively, the content may be sorted in response to the content criteria. The channel metadata may specify metadata that is displayed for the channel 200 including the metadata of the channel data 215, and the content data 235.

Figure 3A:
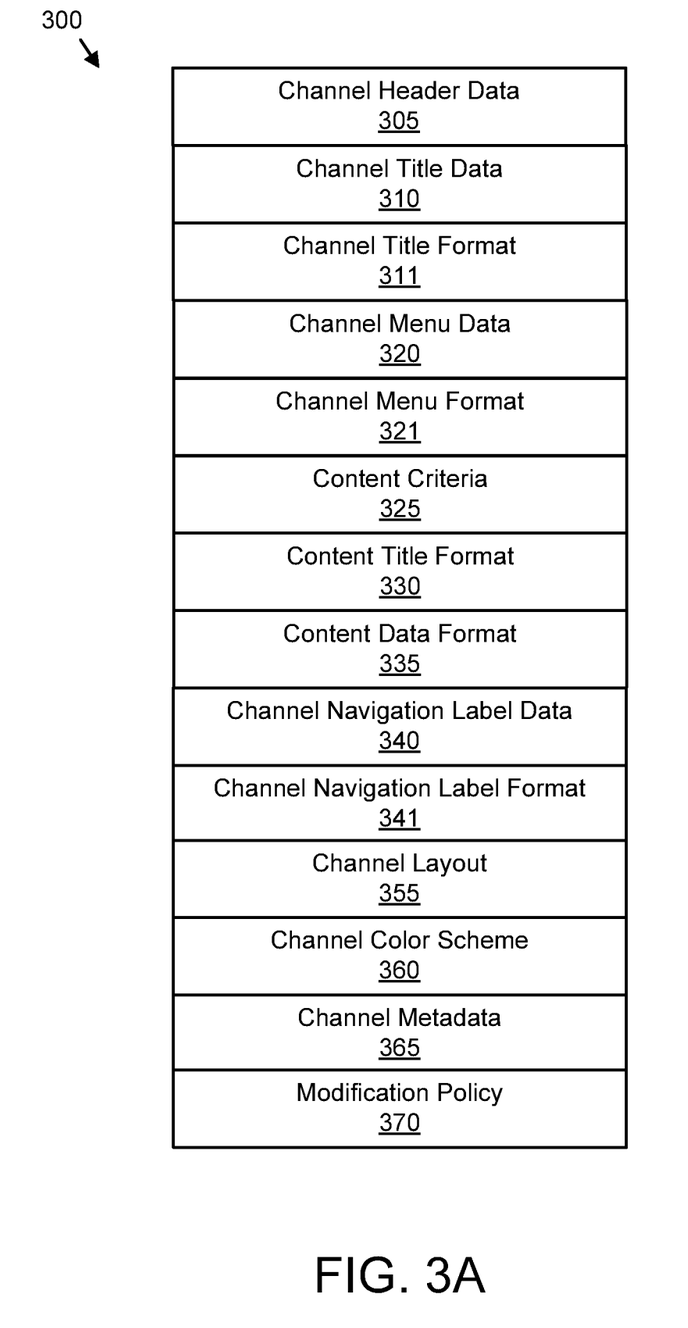
FIG. 3A is a schematic block diagram illustrating one embodiment of appearance data.

FIG. 3A is a schematic block diagram illustrating one embodiment of appearance data 300. The appearance data 300 may specify the channel appearance 245. The appearance data 300 may be embodied in a database, linked data structures, a flat file, or combinations thereof.

In the depicted embodiment, the appearance data 300 includes channel header data 305 for the channel header 205, channel title data 310 for the channel title 210, the channel title format 311, channel menu data 320 for the channel menu 220, the channel menu format 321, the content criteria 325, the content title format 330, the content data format 335, the channel navigation label data 340, the channel navigation label format 341, the channel layout 355, the channel color scheme 360, the channel metadata 365, and a modification policy 370.

The channel title data 310 may include a title. The channel menu data 320 may include one or more menu labels and corresponding links.

The modification policy 370 may include conditions, criteria, policies, and the like that determine if and when to update the channel appearance 245 with an appearance modification. In one embodiment, the modification policy 370 is satisfied at a specified time. For example, the modification policy 370 may be satisfied at 12:01 a.m. on October 31. In a certain embodiment, the modification policy 370 is satisfied for a specified time interval, such as from 8:00 p.m. on July 4 to 2:00 a.m. on July 5.

In one embodiment, the modification policy 370 is satisfied in response to a specified location. The specified location may be a physical and/or logical location of a user 120. For example, modification policy 370 may be satisfied is a user is located in Nebraska. Alternatively, the modification policy 370 may be satisfied in response to engagement activities exceeding an engagement activity threshold as will be described hereafter.

Figure 3B:
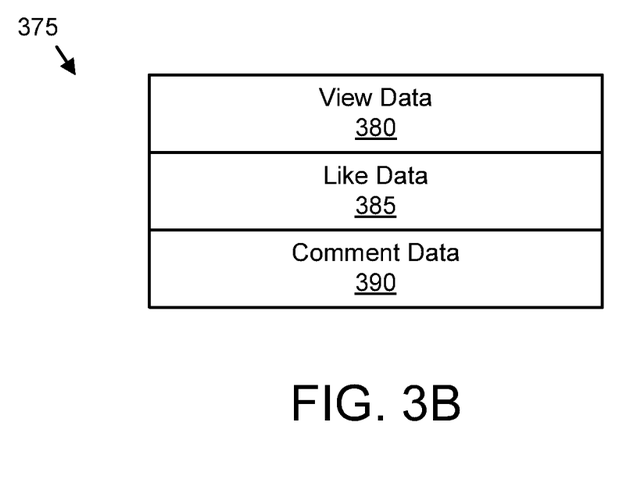
FIG. 3B is a schematic block diagram illustrating one embodiment of engagement data.

FIG. 3B is a schematic block diagram illustrating one embodiment of engagement data 375. The engagement data 375 may record and quantify engagement activity. The engagement data 375 may be embodied in a database, linked data structures, a flat file, or combinations thereof. In the depicted embodiment, the engagement data 375 includes view data 380, like data 385, and comment data 390.

The view data 380 may record views. A view may include displaying content 225 such as an image to the user 120, playing a video for the user 120, playing an audio file for the user 120, displaying text to the user 120, or combinations thereof. The view data 380 may record views of content 225 by users 120. The view data 380 may include total views of the content 225, views by distinct users 120, views per engagement period, and combinations thereof. In one embodiment, the view data 380 may be retrieved from the content host 105.

The like data 385 may record likes for the content 225. A like may be registered by a user 120 to indicate approval for content 225. Alternatively, the like may indicate one of approval, disapproval, and indifference. A user 120 may indicate a like by selecting an icon. The like data 385 may include total likes for the content 225, likes by distinct users 120 for the content 225, likes for the content 225 per engagement period, and combinations thereof.

The comment data 390 may record comments for the content 225. The comments may include text, audio, video, and/or image comments. The comments may be recorded by users 120 to convey an opinion regarding the content 225. In one embodiment, the common data 390 includes a total number of comments, a total number of comments by distinct users 120, a total number of comments within the engagement period, a total number of comments by distinct users 120 within the engagement period, a total of approval keywords in all comments, a total of disapproval keywords in all comments, a total of comments with approval keywords outnumbering disapproval keywords, a total of comments with disapproval keywords outnumbering approval keywords, a total of comments with approval keywords by distinct users 120, a total of comments with disapproval keywords by distinct users 120, an average weighted approval score, and combinations thereof.

Figure 4:
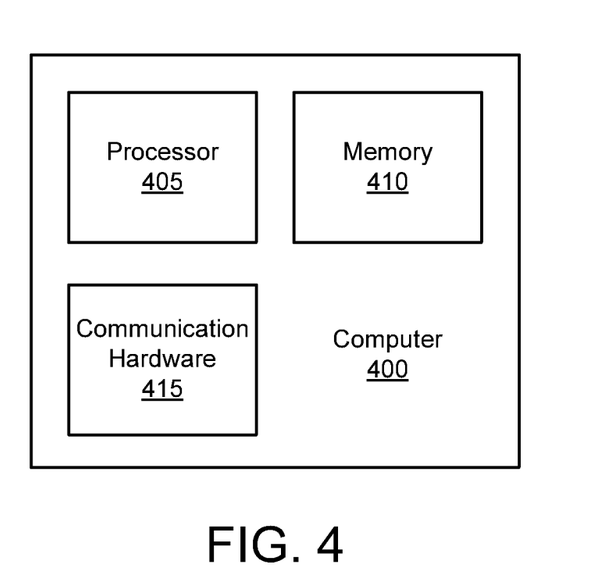
FIG. 4 is a schematic block diagram illustrating one embodiment of a computer.

FIG. 4 is a schematic block diagram illustrating one embodiment of a computer 400. The computer 400 may be embodied in one or more servers, one or more computer workstations, or combinations thereof. The computer 400 includes a processor 405, a memory 410, and communication hardware 415. The memory 410 may be a semiconductor storage device, a hard disk drive, an optical storage device, a micromechanical storage device, or combinations thereof. The memory 410 may store program code. The processor 405 may execute the program code. The communication hardware 415 may communicate with other devices.

Figure 5:
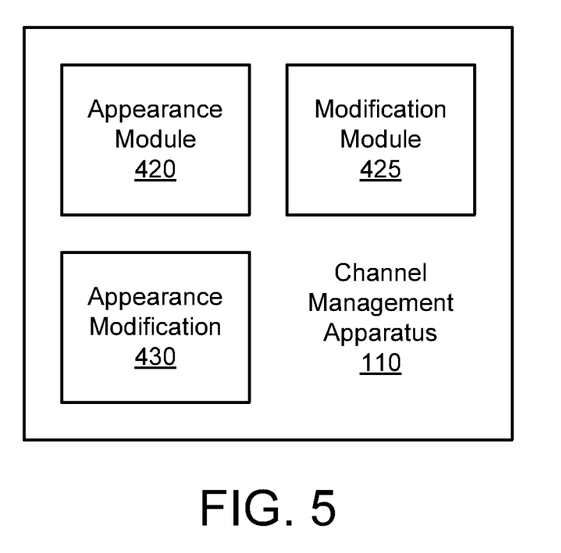
FIG. 5 is a schematic block diagram illustrating one embodiment of a channel management apparatus.

FIG. 5 is a schematic block diagram illustrating one embodiment of the channel management apparatus 110. The apparatus 110 may be embodied in the computer 400. In the depicted embodiment, the apparatus 110 includes an appearance module 420 and a modification module 425. In addition, the apparatus 110 may include an appearance modification 430.

The appearance module 405 and the modification module 410 may be embodied in a computer readable storage medium such as the memory 410. The computer readable storage media may store program code that when executed by the processor 405 performs the functions of the appearance module 420 and the modification module 425.

The appearance modification 430 may include an instance of the appearance data 300 for a specified channel appearance 245. In addition, the modification policy 370 of the appearance data 300 may specify when to update the channel 200 with the specified channel appearance 245 of the appearance modification 430.

The appearance module 420 stores the appearance modification 430 to the channel appearance 245 of the channel 200 providing content 225 from the content host 105. The modification module 425 updates the channel appearance 245 with the appearance modification 430 if the modification policy 370 is satisfied.

Figure 6:
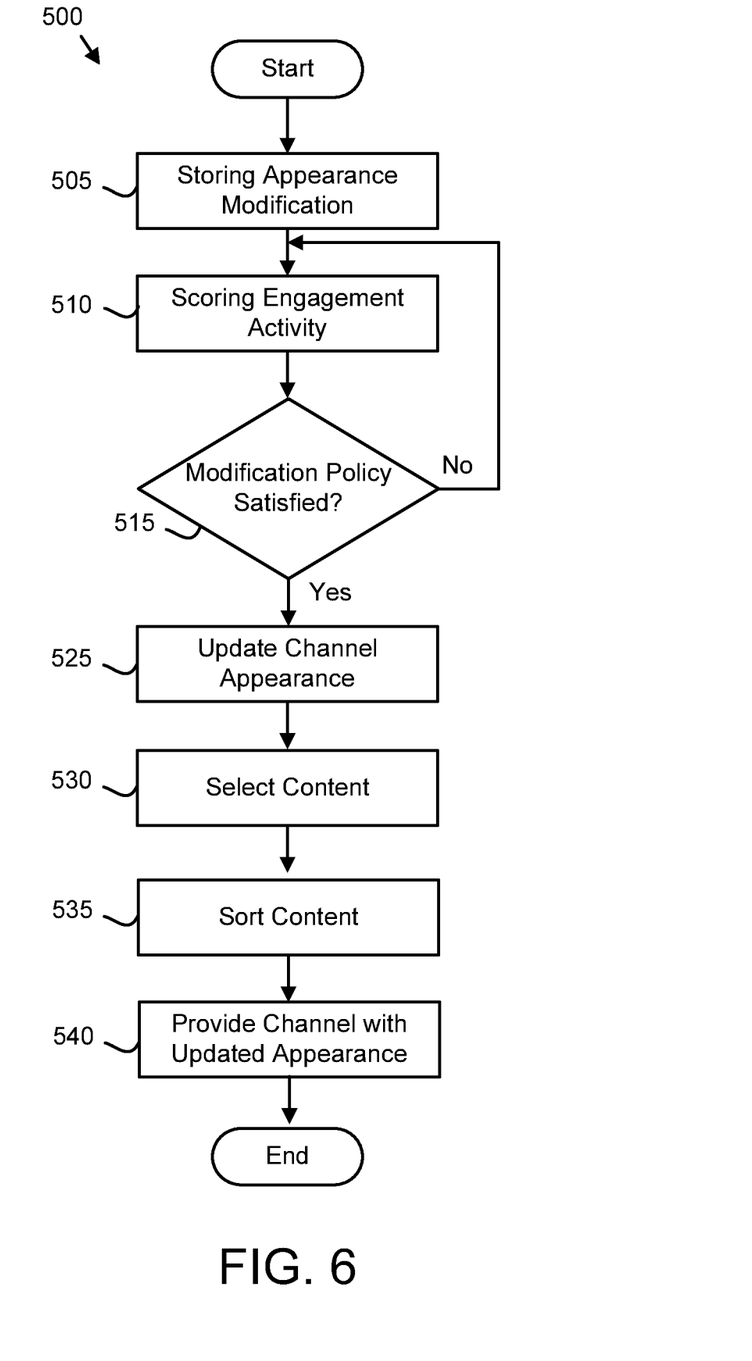
FIG. 6 is a schematic flow chart diagram illustrating one embodiment of a channel appearance update method.

FIG. 6 is a schematic flow chart diagram illustrating one embodiment of a channel appearance update method 500. The method 500 updates the channel appearance 245 of the channel 200. The method 500 may perform the functions of the system 100 and the apparatus 110. In one embodiment, the method 500 is performed by use of the processor 405. Alternatively, the method 500 may be embodied in a program product. The program product may include a computer readable storage medium such as the memory 410. The computer readable storage medium may store program code that is executed by the processor 405 to perform the functions of the method 500.

The method 500 starts, and in one embodiment, the appearance module 420 stores 505 the appearance modification 430 to the channel appearance 245 of the channel 200. The channel 200 provides content 225 from the content host 105. In one embodiment, the appearance modification 430 may include an instance of the appearance data 300 with updates to the channel appearance 245.

An administrator may generate the updates of the appearance data 300. Alternatively, the appearance module 420 may autonomously generate the updates of the appearance data 300. For example, the appearance module 420 may select one or more of the channel header 205, the channel header data 305, the channel title format 311, the channel menu format 321, the content criteria 325, the content title format 330, the content data format 335, the channel navigation label data 340, the channel navigation label format 341, the channel layout 355, the channel color scheme 360, and the channel metadata 365 based on a keyword, a date, search results, and the like.

For example, the appearance module 420 may do a search for content associated with the keyword "Valentine's Day." The appearance module 420 may further retrieve material and content 225 associated with Valentine's Day and identify the common colors, themes, messages, and the like of the retrieved content. The appearance module 420 may generate the appearance data 300 based on the retrieved content.

Alternatively, the appearance module 420 may identify a trending topic. A trending topic may be an athletic event such as the Olympics, the Super Bowl, and/or the World Cup. In a certain embodiment, the trending topic may relate to a celebrity event, a theatrical release, social media traffic, or the like. The appearance module 420 may retrieve content 225 and/or material associated with the trending topic, and may identify messages, themes, images, and the like. The appearance module 420 may generate the appearance data 300 based on the retrieved content, the trending topic, or combinations thereof.

In addition, the appearance module 420 may store a modification policy 370 for the appearance modification 430. In one embodiment, the modification policy 370 may specify a time and/or time interval associated with the keyword, the date, and/or the search results used to generate the appearance data 300. For example, the appearance module 420 may generate the specified time interval of February 14 for the keyword "Valentine's Day." Alternatively, the specified time may be set by the administrator.

In one embodiment, the modification policy 370 specifies a location associated with the keyword and/or the search results. For example, for the keyword "Cornhusker," the appearance module 420 may generate the specified location as a physical and/or location within Nebraska.

In an alternative embodiment, the modification policy 370 may specify an engagement activity threshold. The engagement activity threshold may be related to the keyword, the date, and/or the search results used to generate the appearance data 300. Alternatively, the engagement activity threshold may be set by the administrator. The engagement activity threshold may be a number of views, a number of likes, a number of comments, or combinations thereof.

In one embodiment, the engagement activity threshold is a number of views. Alternatively, the engagement activity threshold may be a number of likes. In one embodiment, the engagement activity threshold is one or more of views per engagement period, likes per engagement period, and comments per engagement period. Alternatively, the engagement activity threshold may be one or more of most views per engagement period, most likes per engagement period, and most comments per engagement period. Addition, the engagement activity threshold may be one of a number of approval comments, a number of disapproval comments, and the like.

The modification module 425 may score 510 the engagement activity for the channel 200. Alternatively, the modification module 425 may score 510 the engagement activity for the content 225 of the channel 200. In one embodiment, the modification module 425 records the views for the channel 200 as view data 380, the likes for the channel 200 as like data 385, and the comments for the channel 200 as comment data 390.

The modification module 425 may calculate an engagement activity score for the channel. The engagement activity score EAS may be calculated using Equation 1, where V is the number of views, L is the number of likes, and C is the number of comments, and k1, k2, and k3 are nonzero constants.

$$EAS=(k1*V)+(k2*L)+(k3*C) \qquad \text{Equation 1}$$

The modification module 425 may determine 515 if the modification policy 370 is satisfied. In one embodiment, the modification policy 370 is satisfied if the current time exceeds the specified time. In addition, the modification policy 370 may be satisfied if the current time is within the specified time interval.

In one embodiment, the modification policy 370 is satisfied if a location of the user 120 is within the specified location. Alternatively, the modification policy 370 may be satisfied if engagement activity for the channel 200 exceeds the engagement activity threshold.

If the modification policy 370 is not satisfied, the modification module 425 may continue to score 510 the engagement activity. If the modification policy 370 is satisfied, the modification module 425 may update 525 the channel appearance 245. In one embodiment, the modification module 425 updates 525 the channel appearance 245 by replacing current appearance data 300 for the channel 200 with the instance of appearance data 300 of the appearance modification 430. The content host 105 may employ the updated appearance data 300 when presenting the channel 200 to users 120.

The modification module 425 may select 530 the content 225 for the channel 200 in response to the engagement activity score. The selection 530 of the content 225 is explained in greater detail in the description of FIG. 7.

The modification module 425 may further sort 535 the content 225 of the channel 200. In one embodiment, the modification module 425 only sorts 535 the selected content 225. The content 225 may be sorted 535 from highest to lowest engagement activity score. Alternatively, the content 225 may be sorted 535 from highest to lowest advertising revenue, from latest to earliest submission date, from earliest to latest submission date, from shortest to longest length, longest to shortest length, or combinations thereof. The content 225 may be displayed in the channel 200 in the sort order.

The content host 105 may provide 540 the channel 200 with the updated channel appearance 245 and the method 500 ends. In one embodiment, the content host 105 employs the updated appearance data 200 to provide 540 the channel 200 with the updated channel appearance 245.

Figure 7:
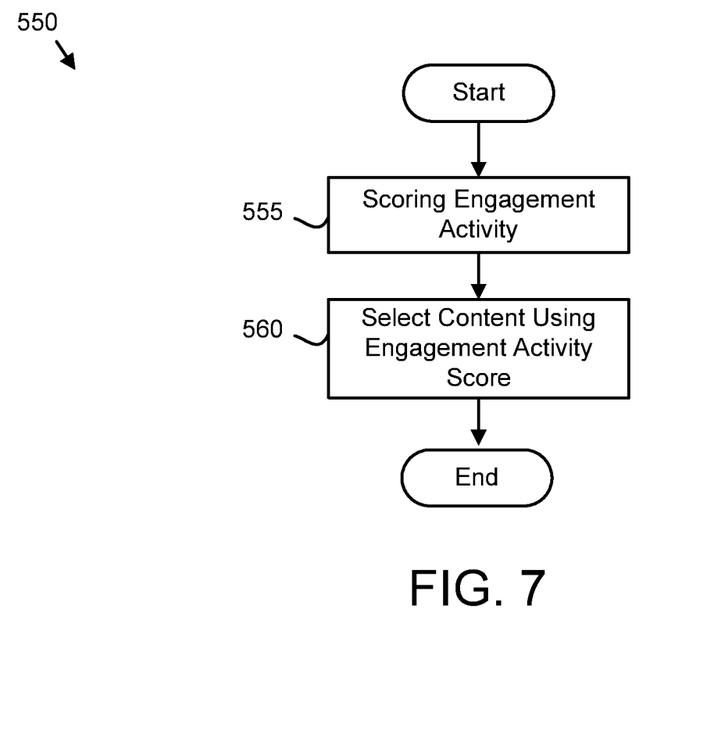
FIG. 7 is a schematic flow chart diagram illustrating one embodiment of an engagement-based content selection method.

FIG. 7 is a schematic flow chart diagram illustrating one embodiment of an engagement-based content selection method 550. The method 550 may perform the select content step 530 of the method 500 of FIG. 6. Alternatively, the method 550 may be performed independently of updating the channel appearance 245.

In one embodiment, the method 550 is performed by use of the processor 405. Alternatively, the method 550 may be embodied in a program product. The program product may include a computer readable storage medium such as the memory 410. The computer readable storage medium may store program code that is executed by the processor 405 to perform the functions of the method 550.

The method 550 may be performed in response to updating the channel appearance 245. Alternatively, the method 550 may be performed each time the channel 200 is displayed by the content host 105. In one embodiment, the method 550 is performed after a specified selection interval such as hourly or daily.

The method 550 starts, and in one embodiment, the modification module 425 scores 555 the engagement activity for the content 225 of the channel 200. The modification module 425 may score 555 the engagement activity as described for the scoring engagement activity step 510 of the method 500 described for FIG. 6.

The modification module 425 may further select 560 content 225 for inclusion in the channel 200 and the method 550 ends. In one embodiment, the modification module 425 selects 560 the content 225 using the engagement activity score.

In one embodiment, content 225 associated with the channel 200 is selected for active inclusion within the channel 200 if the engagement activity score for the content 225 exceeds a minimum engagement activity score. The minimum engagement activity score may be calculated to select 560 a specified number of content 225. For example, if 25 content elements are to be selected 560, the minimum engagement activity score may be set so that the activity engagement scores for only 25 content elements exceed the minimum engagement activity score.

By storing the appearance modification 430 to the channel appearance 245, the embodiments support the rapid updating of the channel appearance 245 when the modification policy 270 is satisfied. The channel appearance 245 may be updated for a specified date such as a holiday. In addition, the channel appearance 245 may be updated for a newsworthy event such as an athletic contest. Alternatively, the channel appearance 245 may be updated for a location. As a result, the channel appearances 245 of multiple channels 200 may be automatically updated frequently and easily, keeping the appearance of the channel 200 fresh and topical.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    storing, by use of a processor, a plurality of appearance data instances, each appearance data instance describing a channel appearance of a channel providing video content from an online video content host and comprising a modification policy, the modification policy comprising a specified time interval and an engagement activity threshold; and
    updating the channel appearance with a first appearance data instance if the modification policy for the first appearance data instance is satisfied, wherein each appearance data instance comprises a channel layout, a channel color scheme, a channel header, a channel title, a channel title format, a channel menu, a channel menu format, content criteria, a channel navigation label, a channel navigation label format, a channel data format, a content title format, a content data format, and channel metadata, the channel data format specifies an appearance of subscription information, channel, and the modification policy is satisfied if an engagement activity score for the channel exceeds the engagement activity threshold, the engagement activity score EAS calculated as $EAS=(k1*V)+(k2*L)+(k3*C)$ where V is a number of views by distinct viewers within an engagement period, L is a number of likes by the distinct viewers within the engagement period, C is a total of comments with disapproval keywords outnumbering approval keywords, and k1, k2, and k3 are non-zero constants;
    scoring the engagement activity for each instance of the content by calculating an engagement activity score for the content instance; and
    selecting the content in response to the engagement activity scores wherein a given content instance is selected if a given engagement activity score for the given content instance exceeds a minimum engagement activity score;
    sorting the content in response to the engagement activity scores; and
    providing the channel with the updated channel appearance.

2. The method of claim 1, the method further comprising selecting the content in response to content criteria.

3. The method of claim 1, the method further comprising sorting the content in response to content criteria.

4. An apparatus comprising:
    a processor;
    a non-transitory computer readable storage medium storing program code executable by the processor to perform:
        storing a plurality of appearance data instances, each appearance data instance describing a channel appearance of a channel providing video content from an online video content host and comprising a modification policy, the modification policy comprising a specified time interval and an engagement activity threshold; and
        updating the channel appearance with a first appearance data instance if the modification policy for the first appearance data instance is satisfied, wherein each appearance data instance comprises a channel layout, a channel color scheme, a channel header, a channel title, a channel title format, a channel menu, a channel menu format, content criteria, a channel navigation label, a channel navigation label format, a channel data format, a content title format, a content data format, and channel metadata, the channel data format specifies an appearance of subscription information, the channel menu provides icons for navigating to specific portions of the channel, and the modification policy is satisfied if engagement activity score for the channel exceeds the engagement activity threshold, the engagement activity score EAS calculated as $EAS=(k1*V)+(k2*L)+(k3*C)$ where V is a number of views by distinct viewers within an engagement period, L is a number of likes by the distinct viewers within the engagement period, C is a total of comments with disapproval keywords outnumbering approval keywords, and k1, k2, and k3 are non-zero constants;
        scoring the engagement activity for each instance of the content by calculating an engagement activity score for the content instance; and
        selecting the content in response to the engagement activity scores wherein a given content instance is selected if a given engagement activity score for the given content instance exceeds a minimum engagement activity score;
        sorting the content in response to the engagement activity scores; and
        providing the channel with the updated channel appearance.

5. A program product comprising a non-transitory computer readable storage medium storing program code executable by a processor to perform:
    storing a plurality of appearance data instances, each appearance data instance describing a channel appearance of a channel providing video content from an online video content host and comprising a modification policy, the modification policy comprising a specified time interval and an engagement activity threshold; and updating the channel appearance with a first appearance data instance if the modification policy for the first appearance data instance is satisfied, wherein each appearance data instance comprises a channel layout, a channel color scheme, a channel header, a channel title, a channel title format, a channel menu, a channel menu format, content criteria, a channel navigation label, a channel navigation label format, a channel data format, channel data format specifies an appearance of subscription information, the channel menu provides icons for navigating to specific portions of the channel, and the modification policy is satisfied if an engagement activity score for the channel exceeds the engagement activity threshold, the engagement activity score EAS calculated as EAS $(k1*V)+(k2*L)+(k3*C)$ where V is a number of views by distinct viewers within an engagement period, L is a number of likes by the distinct viewers within the engagement period, C is a total of comments with disapproval keywords outnumbering approval keywords and k1, k2, and k3 are non-zero constants;

scoring the engagement activity for each instance of the content by calculating an engagement activity score for the content instance; and selecting the content in response to the engagement activity scores wherein a given content instance is selected if a given engagement activity score for the given content instance exceeds a minimum engagement activity score;

sorting the content in response to the engagement activity scores; and providing the channel with the updated channel appearance.

* * * * *